(12) United States Patent
Wigsten

(10) Patent No.: US 6,500,084 B2
(45) Date of Patent: Dec. 31, 2002

(54) SPROCKET SYSTEM FOR INVERTED TOOTH CHAIN

(75) Inventor: Mark MacDonald Wigsten, Lansing, NY (US)

(73) Assignee: BorgWarner, Inc., Auburn Hills, MI (US)

(*) Notice: Subject to any disclaimer, the term of this patent is extended or adjusted under 35 U.S.C. 154(b) by 9 days.

(21) Appl. No.: 09/769,885

(22) Filed: Jan. 25, 2001

(65) Prior Publication Data

US 2002/0098934 A1 Jul. 25, 2002

(51) Int. Cl.[7] .................. F16H 7/06; F16H 55/30; F16G 13/04
(52) U.S. Cl. .................. 474/156; 474/212; 474/152
(58) Field of Search .................. 474/212–215, 474/152–157, 160, 207, 229, 228, 206

(56) References Cited

U.S. PATENT DOCUMENTS

| 495,584 A | 4/1893 | Guthrie | |
| 591,270 A | * 10/1897 | Gauthier | 474/156 |
| 1,835,406 A | 12/1931 | Kristen | |
| 4,174,642 A | 11/1979 | Martin et al. | |
| 5,545,096 A | * 8/1996 | Su | 474/160 |

FOREIGN PATENT DOCUMENTS

| JP | 60164042 A | * 8/1985 |
| JP | 62159829 A | * 7/1987 |

* cited by examiner

Primary Examiner—David A. Bucci
Assistant Examiner—Marcus Charles
(74) Attorney, Agent, or Firm—Brown & Michaels, P.C.; Greg Dziegielewski

(57) ABSTRACT

The chain and sprocket design of the present invention is applicable to sprockets (9) which have an even number of teeth and chains which use inward-pointing teeth and parallel links (2) and outer guides (8). The sprocket is designed such that alternate teeth (6) of the sprocket are of increased width such that when the sprocket is properly oriented they extend outward between outer guide links, which are shaped to allow the teeth to enter the inter-guide gap. If the chain attempts to jump a tooth, such that the sprocket is oriented with the wider teeth aligned with the outer guide links, the wider teeth will contact the guide links and prevent the chain from seating in the sprocket.

5 Claims, 2 Drawing Sheets

SPROCKET SYSTEM FOR INVERTED TOOTH CHAIN

FIELD OF THE INVENTION

The invention pertains to the field of endless chain power transmission systems. More particularly, the invention pertains to chain transmission systems having inwardly opening teeth.

BACKGROUND OF THE INVENTION

All current automobile piston engines have a camshaft and a crankshaft. The crankshaft transmits the power from the pistons as they move up and down and changes it to a rotating motion. The crankshaft drives one or more camshafts, which open and close the valves in the engine. A camshaft has eccentric lobes or cams: one lobe for each valve, which in turn push a cam follower or valve lifter which opens the valve. This must happen at exactly the right time for each valve. This coordination of the crankshaft with the opening and closing of the valves via the camshaft is called Valve Timing or Camshaft Timing.

While the most direct way of driving the camshaft might be by gears on each meshing with each other, this is usually not practical given the location of the crankshaft at the bottom of the engine and the valves (and, in overhead camshaft (OHC) engines, the camshaft) at the top. In many cases, timing chain systems are used to drive the camshaft(s) of an engine from the crankshaft. A chain is looped around a drive sprocket on the crankshaft, and drives a driven sprocket on the camshaft (or one on each camshaft, in a multiple-camshaft engine).

Even a slight misalignment of the camshaft(s) relative to the crankshaft can adversely affect the performance of the engine, and possibly stop it altogether. In extreme cases, in some engines (called "interference engines"), if a valve opens all the way at the same time as the piston comes up, the piston will contact the valve. At best, it can bend or break the valve, and at worst, crack the block or otherwise destroy the engine. Even a single tooth's misalignment can cause this disastrous situation in some interference engines.

This kind of misalignment can be caused by the chain "jumping" a tooth or more, due to slack in the system. FIG. 7 shows how little slack is required for a link (72) in a chain (71) to jump a tooth on a sprocket (70) of the prior art.

As a result, designers of timing chain systems attempt to prevent the chain from jumping teeth on any of the sprockets in the system. Tensioners and guides are frequently used to guide the chain and minimize the slack. Often, ratchet mechanisms are added to tensioners for the purpose of preventing enough slack in a chain strand to allow the chain to rise over and move past a sprocket tooth.

For noise and weight reduction, the teeth on the sprockets and chain pitch in timing chain applications are often reduced in size. As the size of these components is reduced, the potential for the chain "jumping" or slipping in alignment relative to the sprocket is increased, as it takes less slack in a chain strand to move over and past a small sprocket tooth (small pitch) than a larger tooth. The use of small pitch chains is thus prohibited in many cases by the risk of tooth jumping.

A design which would make it more difficult for a chain to jump teeth on a sprocket would be useful for at least two reasons: First, the ratchet mechanism added to the chain tensioner may not be required any longer; Second, the use of very small pitch chains could be considered on applications that currently could not use small pitch chains.

As can be seen in FIGS. 1 and 2, prior art chains are commonly designed with a plurality of parallel inner links (1) which have inward-pointing teeth to engage the teeth of sprockets, connected together with pins (3) to other inner links (2). The inner links are staggered in groups of a number of parallel links followed by a group of one-fewer links, such that if one looked down on a section of chain as shown in FIG. 1, one would see two parallel links (1) pinned (3) to a single inner link (2), then two links, etc. Larger chains might have four inner links pinned to three links, pinned to four links, and so on. Outside guide links (4), which are not toothed, are used parallel to the lesser-number inner link sections (2). The teeth (5) are all of equal width, and engage the inward-extending teeth of the links (1) and (2) (teeth (5) are shaded in FIG. 1 to distinguish them from the links (1)(2)).

Guthrie, "Drive Chain Gear", U.S. Pat. No. 495,584, shows a sprocket and chain system using a modified sprocket which drives the chain between links—that is, the sprocket teeth contact the outsides of the links, rather than through the teeth on the links as in the chain of the invention. Guthrie uses a sprocket which appears to have two rows of thin teeth in parallel, offset by half-a-tooth. While Guthrie's arrangement would have a similar effect to the invention, the drive system is very different, and would require very large teeth, rather than being operable with small teeth and pitches as the current invention.

Kirsten, "Power Transmitting Mechanism", U.S. Pat. No. 1,835,406, uses a similar rows of parallel teeth system to Guthrie, although Kirsten's teeth (or rather the gaps between the teeth) do contact inward-pointing teeth on the chain. Kirsten's sprocket wheel is made up of many laminated thin sprockets, each lamination offset by a half-tooth from its neighbors.

Martin, "Chain Drive including Sprocket Having Alternate Wide and Narrow Teeth", U.S. Pat. No. 4,174,642, shows a chain and sprocket arrangement in which the sprocket has alternating wide and narrow teeth, and the roller type chain has alternating wide and narrow gaps within which the teeth fit. The roller-type chain is different from the chain of the invention—the sprocket drives the rollers, rather than teeth on the links, and the Martin invention would not be suitable for small tooth sockets—small pitch inverted tooth chains as used in the present invention.

Although this invention is described herein in terms of timing chains, which are an important application, it will be understood by one skilled in the art that the invention may also be used in other applications where a small pitch/small tooth chain and sprocket system is desirable.

SUMMARY OF THE INVENTION

The invention is a novel chain and sprocket design which is applicable to sprockets which have an even number of teeth and chains which use inward-pointing teeth and parallel links and outer guides.

In the system of the invention, the sprocket is designed such that alternate teeth of the sprocket are of increased width such that when the sprocket is properly oriented they extend outward between outer guide links, which are shaped to allow the teeth to enter the inter-guide gap. If the chain attempts to jump a tooth, such that the sprocket is oriented with the wider teeth aligned with the outer guide links, the wider teeth will contact the guide links and prevent the chain from seating in the sprocket.

DESCRIPTION OF THE PREFERRED EMBODIMENT

Figure 1:
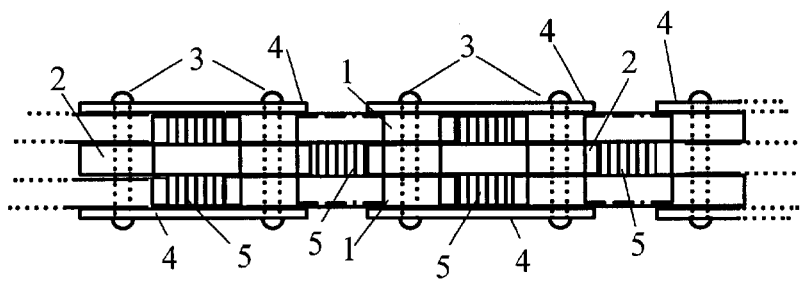
FIG. 1 shows a top view of a typical chain design of the prior art, as it passes over a sprocket.
Figure 2:
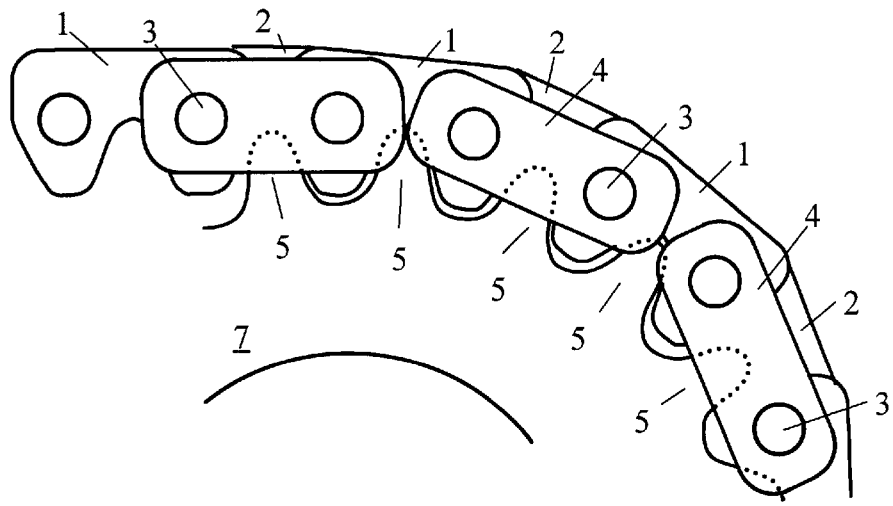
FIG. 2 shows a side view detail of the prior-art chain and sprocket of FIG. 1.
Figure 3:
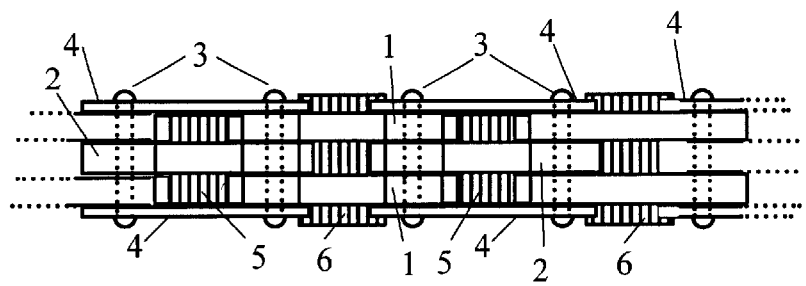
FIG. 3 shows a top view of the chain and sprocket of the invention, at the same point as the prior art chain and sprocket of FIG. 1.
Figure 4:
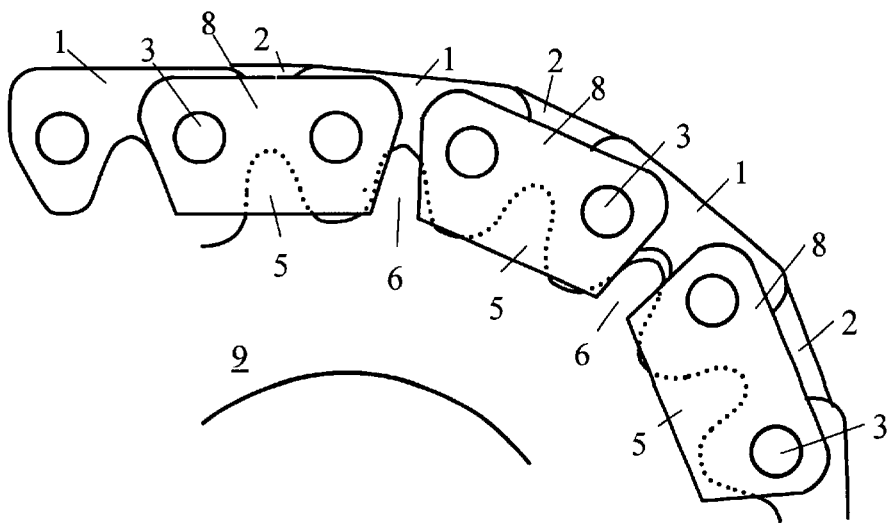
FIG. 4 shows a side-view detail of an extended tooth and guide links of the invention.

FIG. 3 shows a top view of the chain and sprocket system of the invention, similar to the prior art view of FIG. 1. Similarly, FIG. 4 shows a side view of the chain and sprocket system of the invention similar to the prior art view of FIG. 2. Identical reference numbers in the figures refer to identical elements.

As can be seen in FIGS. 3 and 4, in one embodiment of the invention, alternate teeth (6) of the sprocket (9) are widened, so that they extend out between the ends of adjacent guide links (8). The guide links (8) are modified from the prior art design, with the lower corners trimmed to clear the wider teeth (6), as shown in FIG. 4.

Figure 7:
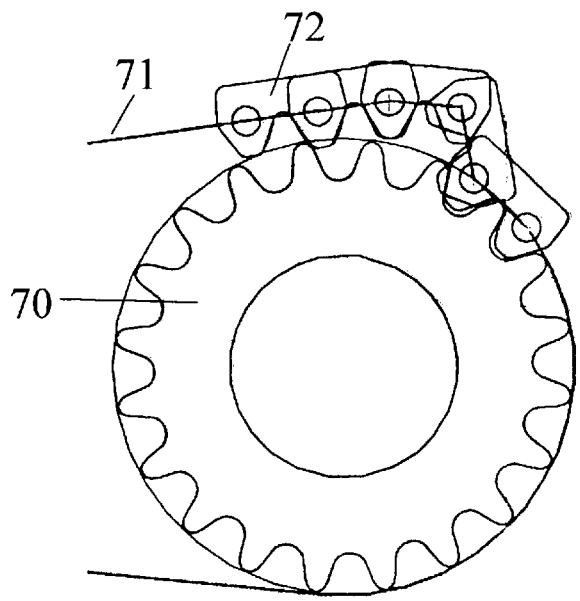
FIG. 7 shows a drawing of a chain and sprocket of the prior art, with the chain jumping a tooth.

With this design, if the chain tries to jump a tooth as in FIG. 7, the guide links (8) will contact the wider teeth (6), and not allow the chain to seat in the jumped position. In order for the chain to jump teeth on the sprocket of the invention, the chain must rise up to disengage the links from the teeth, then translate the length of two chain pitches, rather than the single tooth translation possible in conventional chain arrangements. That means that with the sprocket and chain of the invention the chain will not re-seat on the sprocket until enough slack is provided in the chain strand to allow two pitches of relative movement between the chain and the sprocket. Thus, the chain of the invention is constrained to jump two teeth at a time, if at all—and it would be unlikely that there could be enough slack in the chain for the teeth to rise up enough to jump that far. Thus, with a simple modification of the sprocket (9)(widening half of the teeth (6)), and of the guide links (8) (notching the corners to clear the widened teeth), the chain and sprocket system becomes much less prone to jumping and much more tolerant of slack in the chain. This will allow the use of smaller teeth and chain pitches, and possibly lessen the need for elaborate tensioners.

Figure 5:
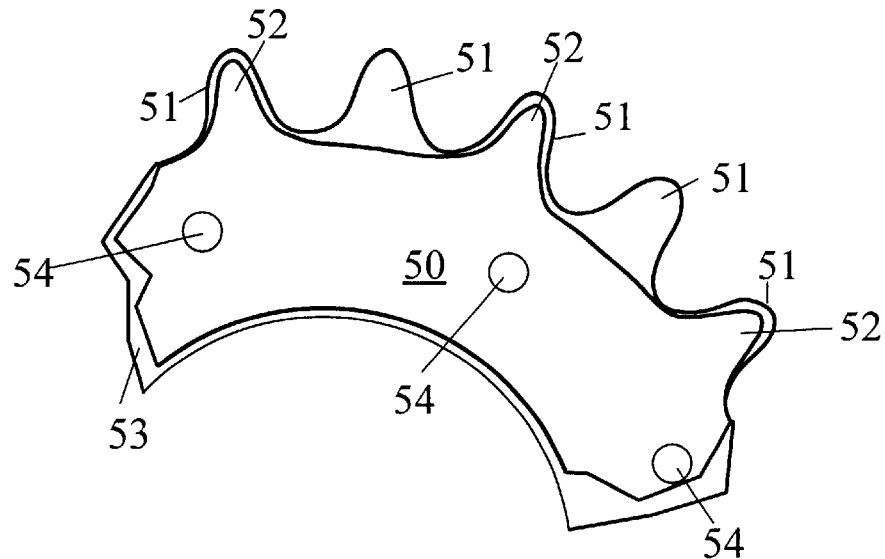
FIG. 5 shows a side view detail of an alternate embodiment of the sprocket of the invention.
Figure 6:
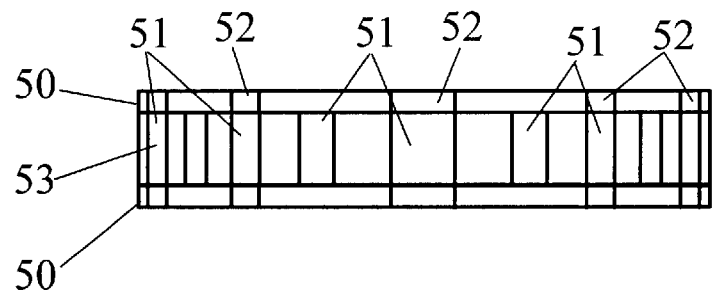
FIG. 6 shows a top view detail of the alternate embodiment of the sprocket of the invention shown in FIG. 5.

FIGS. 5 and 6 show an alternative embodiment of the sprocket of the invention.

The extra width added to every other tooth on the sprocket may be difficult to make in some applications, such as powdered-metal sprockets. This problem can be alleviated by using separate outer guide plates (50) attached to each side of the main sprocket (53). The outer guide plates would look like thin versions of the sprocket with alternate teeth omitted. When clamped, pinned (54) or otherwise attached to the main sprocket, the two outer guide plates would, in effect, widen the alternate teeth (52) on the sprocket, forming the sprocket as described above, without the need for fabricating the actual main sprocket with two widths of teeth.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A sprocket (9) for an inverted tooth chain having a plurality of inner links (1) pinned together, each inner link having at least one tooth, and outer guide links (8) parallel to and mounted outside of alternate inner links, wherein the sprocket comprises:

an even number of teeth for engaging the teeth on the inner links of the chain, the teeth of the sprocket being formed in an alternating pattern of wider (6) and narrower (5) teeth, wherein the wider teeth (6) have a width such that when the chain is engaged with the sprocket the wider teeth will contact the outer guide links, preventing the chain from seating when the sprocket is oriented to put the wider teeth engaging the inner links which have the outer guide links parallel to the inner links.

2. The sprocket of claim 1, in which the sprocket further comprises a central sprocket (53) having the even number of teeth and a first outer guide plate and a second outer guide plate (50) mounted to the central sprocket, the outer guide plates having the same tooth pitch as the central sprocket, but with alternate teeth omitted, the teeth of the first outer guide plate and the second outer guide plate being aligned with the alternate teeth of the central sprocket.

3. A sprocket and chain system, comprising:

an inverted tooth chain comprising:
a plurality of inner links pinned together, each inner link having at least one tooth; and
a plurality of outer guide links parallel to and mounted outside of alternate inner links; and a sprocket comprising an even number of teeth for engaging the teeth on the inner links of the chain, the teeth of the sprocket being formed in an alternating pattern of wider and narrower teeth, the wider teeth having a width such that when the chain is engaged with the sprocket the wider teeth will contact the outer guide links, preventing the chain from seating when the sprocket is oriented to put the wider teeth engaging the inner links which have the outer guide links parallel to the inner links.

4. The sprocket and chain of claim 3, in which the sprocket further comprises a central sprocket having the even number of teeth and a first outer guide plate and a second outer guide plate mounted to the central sprocket, the first outer guide plate and the second outer guide plate having the same tooth pitch as the central sprocket, but with alternate teeth omitted, the teeth of the first outer guide plate and the second outer guide plate being aligned with the alternate teeth of the central sprocket.

5. The sprocket and chain of claim 3, in which the outer guide links are shaped such that the wider teeth of the sprocket can pass between the outer guide links without interference.

\* \* \* \* \*